(12) United States Patent
Hwang

(10) Patent No.: US 9,997,783 B2
(45) Date of Patent: Jun. 12, 2018

(54) POSITIVE ELECTRODE FOR RECHARGEABLE LITHIUM BATTERY AND RECHARGEABLE LITHIUM BATTERY INCLUDING SAME

(71) Applicant: SAMSUNG SDI CO., LTD., Yongin-si, Gyeonggi-do (KR)

(72) Inventor: Cheol-Hee Hwang, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 140 days.

(21) Appl. No.: 14/942,724

(22) Filed: Nov. 16, 2015

(65) Prior Publication Data
US 2016/0141627 A1 May 19, 2016

(30) Foreign Application Priority Data
Nov. 19, 2014 (KR) .................. 10-2014-0161935

(51) Int. Cl.
*H01M 4/62* (2006.01)
*H01M 10/052* (2010.01)
*H01M 4/02* (2006.01)

(52) U.S. Cl.
CPC ......... *H01M 4/623* (2013.01); *H01M 10/052* (2013.01); *H01M 2004/028* (2013.01); *H01M 2220/30* (2013.01)

(58) Field of Classification Search
CPC .................................................. H01M 4/623
See application file for complete search history.

(56) References Cited

U.S. PATENT DOCUMENTS

| 6,265,107 | B1 * | 7/2001 | Shimizu | H01M 4/621 |
| | | | | 429/217 |
| 2013/0095382 | A1 * | 4/2013 | Kim | H01M 4/131 |
| | | | | 429/211 |
| 2015/0311530 | A1 * | 10/2015 | Sasaki | H01M 4/1391 |
| | | | | 252/182.1 |

FOREIGN PATENT DOCUMENTS

| KR | 1999-0057620 A | 7/1999 |
| KR | 10-0373728 B1 | 2/2003 |
| KR | 10-0786850 B1 | 12/2007 |

OTHER PUBLICATIONS

Liu et al. ("Melting and crystallization of poly(vinylidene fluoride) blended with polyamide" Polymer, vol. 38, issue 20, pp. 5149-5153).*
Korean Patent Abstracts Publication No. 10-0439164 B1, dated Jun. 25, 2004, for KR 1999-0057620 A, 1 page.
Korean Patent Abstracts Publication No. 10-2002-0018486 A, dated Mar. 8, 2002, for KR 10-0373728 B1, 1 page.

* cited by examiner

*Primary Examiner* — Peter F Godenschwager
(74) *Attorney, Agent, or Firm* — Lewis Roca Rothgerber Christie LLP

(57) ABSTRACT

A positive electrode for a rechargeable lithium battery includes a positive active material and a binder including polyvinylidene fluoride, a carboxyl group-containing polyvinylidene fluoride, and poly(vinylidenefluoride-tetrafluoroethylene). The positive electrode may have an improved binding force and increased flexibility. A rechargeable lithium battery includes the positive electrode. The rechargeable lithium battery may have high capacity and excellent performance.

19 Claims, 2 Drawing Sheets

POSITIVE ELECTRODE FOR RECHARGEABLE LITHIUM BATTERY AND RECHARGEABLE LITHIUM BATTERY INCLUDING SAME

CROSS-REFERENCE TO RELATED APPLICATION

This application claims priority to and the benefit of Korean Patent Application No. 10-2014-0161935 filed in the Korean Intellectual Property Office on Nov. 19, 2014, the entire contents of which are incorporated herein by reference.

BACKGROUND

1. Field

A positive electrode for a rechargeable lithium battery and a rechargeable lithium battery including the same are disclosed.

2. Description of the Related Art

A rechargeable lithium battery has recently drawn attention as a power source for small portable electronic devices. It uses an organic electrolyte solution and thereby, has twice or more high discharge voltage than a battery using an alkali aqueous solution, and accordingly, the rechargeable lithium battery has a high energy density.

The rechargeable lithium battery may secure high capacity through an electrode having high density (e.g., high active material density). However, the electrode having high density may become thicker as an active mass is loaded to a higher level, and thus, flexibility of the electrode and safety of a slurry for forming the electrode may be deteriorated. Accordingly, performance of a battery may be deteriorated.

SUMMARY

An aspect of one embodiment provides a positive electrode for a rechargeable lithium battery securing high capacity and excellent battery performance by simultaneously improving both binding force and flexibility of the electrode.

Another embodiment provides a rechargeable lithium battery including the positive active material for a rechargeable lithium battery.

In one embodiment, a positive electrode for a rechargeable lithium battery includes a positive active material and a binder including polyvinylidene fluoride, a carboxyl group-containing polyvinylidene fluoride and poly(vinylidenefluoride-tetrafluoroethylene).

The polyvinylidene fluoride may have a different melting point (Tm) from a melting point (Tm) of the carboxyl group-containing polyvinylidene fluoride, and the melting point (Tm) of the polyvinylidene fluoride may be about 148° C. to about 176° C.

The polyvinylidene fluoride may have a different crystallization temperature (Tc) from a crystallization temperature (Tc) of the carboxyl group-containing polyvinylidene fluoride, and the crystallization temperature (Tc) of the polyvinylidene fluoride may be about 132° C. to about 147° C.

The polyvinylidene fluoride may be included in the binder in an amount of about 60 wt % to about 80 wt % based on the total weight of the binder.

The carboxyl group-containing polyvinylidene fluoride may include at least one carboxyl group in a repeating unit derived from vinylidenefluoride.

The carboxyl group-containing polyvinylidene fluoride may have a different melting point (Tm) from a melting point (Tm) of the polyvinylidene fluoride, and the melting point (Tm) of the carboxyl group-containing polyvinylidene fluoride may be about 145° C. to about 174° C.

The carboxyl group-containing polyvinylidene fluoride may have a different crystallization temperature (Tc) from a crystallization temperature (Tc) of the polyvinylidene fluoride, and the crystallization temperature (Tc) of the carboxyl group-containing polyvinylidene fluoride may be about 125° C. to about 145° C.

The carboxyl group-containing polyvinylidene fluoride may be included in the binder in an amount of about 5 wt % to about 20 wt % based on the total weight of the binder The poly(vinylidenefluoride-tetrafluoroethylene) may include about 10 mol % to about 40 mol % of a repeating unit derived from tetrafluoroethylene, based on the total moles of repeating units of the poly(vinylidenefluoride-tetrafluoroethylene).

The poly(vinylidenefluoride-tetrafluoroethylene) may be included in the binder in an amount of about 5 wt % to about 20 wt % based on the total weight of the binder.

The carboxyl group-containing polyvinylidene fluoride and the poly(vinylidenefluoride-tetrafluoroethylene) may be included in the binder at a weight ratio of about 0.25:1 to about 1:1.

In another embodiment, a rechargeable lithium battery includes the positive electrode.

Other embodiments are included in the following detailed description.

A rechargeable lithium battery having high capacity and excellent battery performance may be realized by simultaneously improving both binding force and flexibility of an electrode.

BRIEF DESCRIPTION OF THE DRAWINGS

The accompanying drawings, together with the specification, illustrate embodiments of the present invention, and, together with the description, serve to explain the principles of the present invention.

DETAILED DESCRIPTION

Hereinafter, certain embodiments of the present invention are shown and described, by way of illustration. However, these embodiments are exemplary, and this disclosure is not limited thereto. Indeed, as those skilled in the art would recognize, the invention may be embodied in many different forms. Also, in the context of the present application, when a first element is referred to as being "on" a second element, it can be directly on the second element or be indirectly on the second element with one or more intervening elements interposed therebetween.

A rechargeable lithium battery according to one embodiment will be described with reference to FIG. 1.

Figure 1:
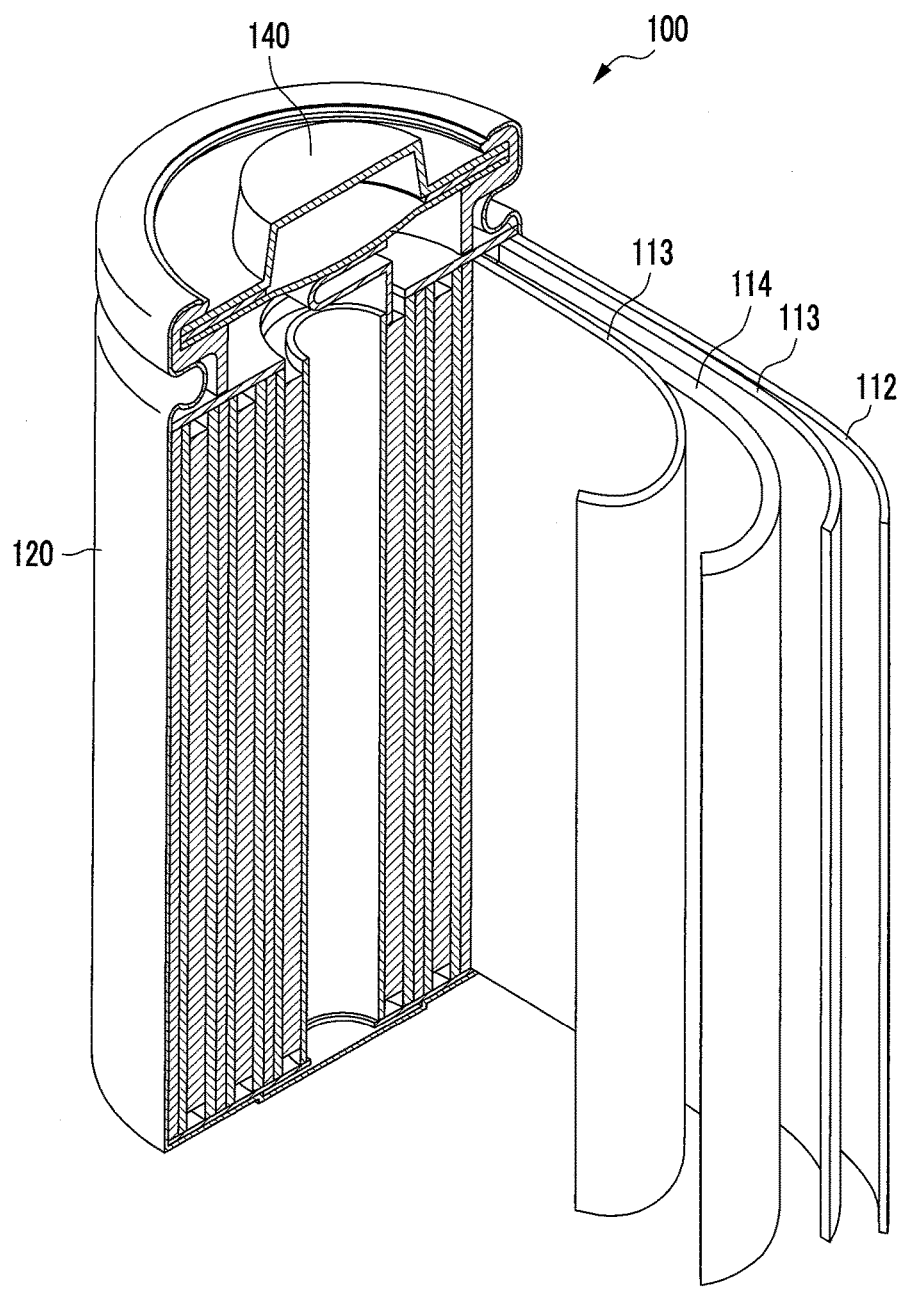
FIG. 1 is a schematic view showing a rechargeable lithium battery according to one embodiment.

FIG. 1 is a schematic view showing a rechargeable lithium battery according to one embodiment.

Referring to FIG. 1, a rechargeable lithium battery 100 according to one embodiment includes an electrode assembly including a positive electrode 114, a negative electrode 112 facing the positive electrode 114, a separator 113 interposed between the negative electrode 112 and the positive electrode 114, an electrolyte solution impregnating the positive electrode 114, the negative electrode 112, and the separator 113, a battery case 120 housing the electrode assembly, and a sealing member 140 sealing the battery case 120.

The positive electrode includes a current collector and a positive active material layer formed on the current collector.

The current collector may include aluminum, but the current collector is not limited thereto.

The positive active material layer includes a positive active material and a binder (e.g., as a mixture including the positive active material and the binder).

The binder improves binding properties of positive active material particles to one another and to a current collector.

The binder may include polyvinylidene fluoride, a carboxyl group-containing polyvinylidene fluoride, and poly(vinylidenefluoride-tetrafluoroethylene). When these binders are used singularly or in a mixture of two binders (e.g., a mixture that includes two of the foregoing binders, but not all three of those binders), an electrode including the binders may have an excellent binding force but deteriorated flexibility or excellent flexibility but a deteriorated binding force on the contrary, and thus, a battery including such an electrode may hardly secure high-capacity and excellent performance. According to one embodiment, a rechargeable lithium battery having excellent battery performance as well as securing high capacity may be realized by using a mixture including the three kinds of binder identified above, thereby simultaneously improving both binding force and flexibility of an electrode, for example, a positive electrode for the rechargeable lithium battery.

The polyvinylidene fluoride may be a homopolymer in which a vinylidenefluoride monomer is polymerized.

The polyvinylidene fluoride may have a different melting point (Tm) from the melting point (Tm) of the carboxyl group-containing polyvinylidene fluoride. For example, the polyvinylidene fluoride may have a melting point (Tm) of about 148° C. to about 176° C. or, for example, about 164° C. to about 172° C. The polyvinylidene fluoride may have a different crystallization temperature (Tc) from the crystallization temperature (Tc) of the carboxyl group-containing polyvinylidene fluoride. For example, the polyvinylidene fluoride may have a crystallization temperature (Tc) of about 132° C. to about 147° C. or, for example, about 133° C. to about 143° C. When the polyvinylidene fluoride has a melting point and a crystallization temperature within the ranges, respectively, positive active material particles may be adhered to one another, and a positive active material may be attached to a current collector.

The polyvinylidene fluoride may be included in the binder in an amount of about 60 wt % to about 80 wt % or, for example, about 60 wt % to about 72 wt % based on the total amount (e.g., weight) of the binder. When the polyvinylidene fluoride is included within the range, an effective network among the positive active material particles may be formed.

The carboxyl group-containing polyvinylidene fluoride may be a polymerization homopolymer of a monomer in which at least one hydrogen of a vinylidenefluoride monomer is substituted with a carboxyl group. In other words, the carboxyl group-containing polyvinylidene fluoride includes at least one carboxyl group in a repeating unit derived from the vinylidenefluoride (e.g., the vinylidenefluoride monomer substituted with a carboxyl group).

The carboxyl group-containing polyvinylidene fluoride may have a different melting point (Tm) from the melting point (Tm) of the polyvinylidene fluoride. For example, the carboxyl group-containing polyvinylidene fluoride may have a melting point (Tm) of about 145° C. to about 174° C. or, for example, about 155° C. to about 168° C. The carboxyl group-containing polyvinylidene fluoride may have a different crystallization temperature (Tc) from the crystallization temperature (Tc) of the polyvinylidene fluoride. For example, the carboxyl group-containing polyvinylidene fluoride may have a crystallization temperature (Tc) of about 125° C. to about 145° C. or, for example, about 125° C. to about 140° C. When the carboxyl group-containing polyvinylidene fluoride has a melting point and a crystallization temperature within the ranges, respectively, binding force of a binder may be further increased.

The carboxyl group-containing polyvinylidene fluoride may be included in the binder in an amount of about 5 wt % to about 20 wt % or, for example, about 10 wt % to about 20 wt % based on the total amount (e.g., weight) of the binder. When the carboxyl group-containing polyvinylidene fluoride is included within the range, adherence of a positive active material to a current collector may be maximized or increased, while battery resistance may be minimized or reduced.

When the poly(vinylidenefluoride-tetrafluoroethylene) is used with the polyvinylidene fluoride and the carboxyl group-containing polyvinylidene fluoride, resistance increase of an electrode due to the carboxyl group-containing polyvinylidene fluoride may be suppressed, and both binding force and flexibility of the electrode may be simultaneously improved.

The poly(vinylidenefluoride-tetrafluoroethylene) is a polymerization copolymer of a vinylidenefluoride monomer and a tetrafluoroethylene monomer. For example, the poly(vinylidenefluoride-tetrafluoroethylene) includes a repeating unit derived from vinylidenefluoride (e.g., the vinylidene fluoride monomer) and a repeating unit derived from tetrafluoroethylene (e.g., the tetrafluoroethylene monomer).

The poly(vinylidenefluoride-tetrafluoroethylene) may include about 10 mol % to about 40 mol %, and, for example, about 10 mol % to about 35 mol % the repeating unit derived from tetrafluoroethylene, based on the total moles of repeating units of the poly(vinylidenefluoride-tetrafluoroethylene). When the repeating unit derived from tetrafluoroethylene is included within the range, density of an electrode may be increased, and simultaneously, flexibility of the electrode may also be improved.

The poly(vinylidenefluoride-tetrafluoroethylene) may have a melting point (Tm) of about 122° C. to about 155° C., and a crystallization temperature (Tc) of about 116° C. to about 134° C.

The poly(vinylidenefluoride-tetrafluoroethylene) may be included in the binder in an amount of about 5 wt % to about 20 wt % or, for example, about 10 wt % to about 20 wt % based on the total amount (e.g., weight) of the binder. When the poly(vinylidenefluoride-tetrafluoroethylene) is included within the range, flexibility of the electrode may be improved.

The carboxyl group-containing polyvinylidene fluoride and the poly(vinylidenefluoride-tetrafluoroethylene) may be included in the binder in a weight ratio of about 0.25:1 to about 1:1 or, for example, about 0.5:1 to about 1:1. When those two kinds of binder are included within the weight ratio range, excellent binding force and flexibility of an electrode may be simultaneously secured.

The positive active material may be a compound (e.g., a lithiated intercalation compound) capable of intercalating and deintercalating lithium, and, for example, lithium metal oxide.

The lithium metal oxide may be an oxide of lithium and at least one metal selected from cobalt, manganese, nickel, or aluminum. For example, the lithium metal oxide may be a compound selected the following chemical formulae.

$Li_aA_{1-b}X_bD_2$ (0.90≤a≤1.8, 0≤b≤0.5); $Li_aA_{1-b}X_bO_{2-c}D_c$ (0.90≤a≤1.8, 0≤b≤0.5, 0≤c≤0.05); $Li_aE_{1-b}X_bO_{2-c}D_c$ (0.90≤a≤1.8, 0≤b≤0.5, 0≤c≤0.05); $Li_aE_{2-b}X_bO_{4-c}D_c$ (0.90≤a≤1.8, 0≤b≤0.5, 0≤c≤0.05); $Li_aNi_{1-b-c}Co_bX_cD_\alpha$ (0.90≤a≤1.8, 0≤b≤0.5, 0≤c≤0.05, 0<α≤2); $Li_aNi_{1-b-c}Co_bX_cO_{2-\alpha}T_\alpha$ (0.90≤a≤1.8, 0≤b≤0.5, 0≤c≤0.05, 0<α<2); $Li_aNi_{1-b-c}Co_bX_cO_{2-\alpha}T_2$ (0.90≤a≤1.8, 0≤b≤0.5, 0≤c≤0.05, 0<α<2); $Li_aNi_{1-b-c}Mn_bX_cD_\alpha$ (0.90≤a≤1.8, 0≤b≤0.5, 0≤c≤0.05, 0<α≤2); $Li_aNi_{1-b-c}Mn_bX_cO_{2-\alpha}T_\alpha$ (0.90≤a≤1.8, 0≤b≤0.5, 0≤c≤0.05, 0<α<2); $Li_aNi_{1-b-c}Mn_bX_cO_{2-\alpha}T_2$ (0.90≤a≤1.8, 0≤b≤0.5, 0≤c≤0.05, 0<α<2); $Li_aNi_bE_cG_dO_2$ (0.90≤a≤1.8, 0≤b≤0.09, 0≤c≤0.5, 0.001≤d≤0.1); $Li_aNi_bCo_cMn_dG_eO_2$ (0.90≤a≤1.8, 0≤b≤0.9, 0≤c≤0.5, 0≤d≤0.5, 0.001≤e≤0.1); $Li_aNiG_bO_2$ (0.90≤a≤1.8, 0.001≤b≤0.1); $Li_aCoG_bO_2$ (0.90≤a≤1.8, 0.001≤b≤0.1); $Li_aMn_{1-b}G_bO_2$ (0.90≤a≤1.8, 0.001≤b≤0.1); $Li_aMn_2G_bO_4$ (0.90≤a≤1.8, 0.001≤b≤0.1); $Li_aMn_{1-g}G_gPO_4$ (0.90≤a≤1.8, 0≤g≤0.5); $QS_2$; $LiV_2O_5$; $LiZO_2$; $LiNiVO_4$; $Li_{(3-f)}J_2(PO_4)_3$ (0≤f≤2); $Li_{(3-f)}Fe_2(PO_4)_3$ (0≤f≤2); $LiFePO_4$ In the above chemical formulae, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

The positive active material layer may further include a conductive material.

The conductive material improves electrical conductivity of an electrode. Any suitable, electrically conductive material may be used as a conductive material, unless it causes an unsuitable chemical change in the battery or the electrode. Examples thereof may include a carbon-based material such as natural graphite, artificial graphite, carbon black, acetylene black, ketjen black, a carbon fiber and the like; a metal-based material such as a metal powder, a metal fiber, and the like of copper, nickel, aluminum, silver, and the like; a conductive polymer such as a polyphenylene derivative and the like; or a mixture thereof.

The negative electrode includes a current collector and a negative active material layer disposed on the current collector.

The current collector may be a copper foil, nickel foil, a stainless steel foil, titanium foil, a nickel foam, a copper foam, a polymer substrate coated with a conductive metal, or a combination thereof, but the current collector is not limited thereto.

The negative active material layer may include a negative active material and a binder.

The negative active material may be a material that reversibly intercalates/deintercalates lithium ions, lithium metal, a lithium metal alloy, a material capable of doping and dedoping lithium, or a transition metal oxide.

The material that reversibly intercalates/deintercalates lithium ions may be a carbon material that may be any suitable carbon-based negative active material available for a rechargeable lithium battery, and examples thereof may include crystalline carbon, amorphous carbon, or a combination thereof. The crystalline carbon may be non-shaped (e.g., amorphous), or may be sheet, flake, spherical, or fiber shaped natural graphite or artificial graphite and the amorphous carbon may be soft carbon or hard carbon, a mesophase pitch carbonized product, fired cokes, and the like.

The lithium metal alloy may be an alloy of lithium and a metal selected from Na, K, Rb, Cs, Fr, Be, Mg, Ca, Sr, Si, Sb, Pb, In, Zn, Ba, Ra, Ge, Al, and Sn.

The material capable of doping and dedoping lithium may be Si, $SiO_x$ (0<x<2), a Si—C composite, a Si-Q alloy (wherein Q is an alkali metal, an alkaline-earth metal, Group 13 to Group 16 elements, a transition metal, a rare earth element or a combination thereof, and not Si), Sn, $SnO_2$, a Sn—C composite, Sn—R (wherein R is an alkali metal, an alkaline-earth metal, Group 13 to Group 16 elements, a transition metal, a rare earth element or a combination thereof, and not Sn), or the like. At least one of these materials may be mixed with $SiO_2$. The elements Q and R may be Mg, Ca, Sr, Ba, Ra, Sc, Y, Ti, Zr, Hf, Rf, V, Nb, Ta, Db, Cr, Mo, W, Sg, Tc, Re, Bh, Fe, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof.

The transition metal oxide may be vanadium oxide, lithium vanadium oxide, or the like.

The binder improves binding properties of negative active material particles to one another and to a current collector. Examples of the binder include a non-water-soluble binder, a water-soluble binder, or a combination thereof.

The non-water-soluble binder includes polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder includes a styrene-butadiene rubber, an acrylated styrene-butadiene rubber, polyvinyl alcohol, sodium polyacrylate, a copolymer of propylene and a C2 to C8 olefin, a copolymer of (meth)acrylic acid and (meth)acrylic acid alkyl ester, or a combination thereof.

When the water-soluble binder is used as a negative electrode binder, a cellulose-based compound may be further used to provide viscosity. The cellulose-based compound includes one or more of carboxylmethyl cellulose, hydroxypropylmethyl cellulose, methyl cellulose, or alkali metal salts thereof. The alkali metal may be Na, K, or Li. Such a thickener may be included in an amount of about 0.1 parts by weight to about 3 parts by weight based on 100 parts by weight of the negative active material.

The negative active material layer may further include a conductive material.

The conductive material is included to improve electrode conductivity. Any suitable, electrically conductive material may be used as a conductive material unless it causes an unsuitable chemical change in the battery or the electrode. Examples of the conductive material include a carbon-based material such as natural graphite, artificial graphite, carbon black, acetylene black, ketjen black, a carbon fiber, and the like; a metal-based material of a metal powder or a metal fiber including copper, nickel, aluminum, silver and the like; a conductive polymer such as a polyphenylene derivative; or a mixture thereof.

The positive electrode and the negative electrode may be respectively manufactured by mixing each active material, a conductive material and a binder in a solvent to prepare an active material composition, and coating the composition on a current collector. The electrode manufacturing method may be any suitable method in the art of manufacturing electrodes, and thus, the method is not further described here. The solvent may be N-methylpyrrolidone, or the like, or an aqueous solvent such as water or the like may be used according to the kind of the binder, but the solvent is not limited thereto.

The electrolyte solution includes a non-aqueous organic solvent and a lithium salt.

The non-aqueous organic solvent serves as a medium for transmitting ions taking part in the electrochemical reaction of a battery. The non-aqueous organic solvent may be selected from a carbonate-based, ester-based, ether-based, ketone-based, alcohol-based and aprotic solvent.

The carbonate-based solvent may be, for example, dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), or the like.

For example, when the carbonate-based solvent is prepared by mixing a cyclic carbonate and a linear carbonate, a solvent having a low viscosity while having an increased dielectric constant may be obtained. The cyclic carbonate and the linear carbonate are mixed together to a volume ratio of about 1:1 to 1:9.

The ester-based solvent may include, for example, methyl acetate, ethyl acetate, n-propyl acetate, dimethyl acetate, methyl propionate, ethyl propionate, γ-butyrolactone, decanolide, valerolactone, mevalonolactone, caprolactone, or the like. The ether-based solvent may include, for example, dibutylether, tetraglyme, diglyme, dimethoxyethane, 2-methyltetrahydrofuran, tetrahydrofuran, or the like, and the ketone-based solvent may include cyclohexanone, or the like. The alcohol-based solvent may include ethanol, isopropyl alcohol, or the like.

The non-aqueous organic solvent may be used singularly or in a mixture. When the organic solvent is used in a mixture, the mixture ratio can be controlled in accordance with a suitable or desirable battery performance.

The non-aqueous electrolyte solution may further include an overcharge-inhibiting additive such as ethylene carbonate, pyrocarbonate, or the like.

The lithium salt dissolved in the non-aqueous organic solvent supplies lithium ions in the battery, and operates a basic operation of a rechargeable lithium battery and improves lithium ion transportation between positive and negative electrodes.

The lithium salt may include one selected from $LiPF_6$, $LiBF_4$, $LiSbF_6$, $LiAsF_6$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein x and y are natural numbers, for example, an integer of 1 to 20), LiCl, LiI, $LiB(C_2O_4)_2$ (lithium bis (oxalato) borate; LiBOB), and a combination thereof.

The lithium salt may be used at a concentration of about 0.1 M to about 2.0 M. When the lithium salt is included at the above concentration range, an electrolyte solution may have excellent performance and lithium ion mobility due to suitable or appropriate conductivity and viscosity of an electrolyte solution.

The separator may include any suitable materials available in the art of lithium batteries as long as the separator is capable of separating the negative electrode from the positive electrode and providing a transporting passage of lithium ion. In other words, the separator may have a low resistance to ion transport and an excellent impregnation for electrolyte solution. For example, a material of the separator may be selected from glass fiber, polyester, polyethylene, polypropylene, polytetrafluoroethylene (PTFE), or a combination thereof. The material of the separator may have a form of a non-woven fabric or a woven fabric. For example, for the lithium ion battery, a polyolefin-based polymer separator such as polyethylene, polypropylene or the like is mainly used. In order to ensure the heat resistance or mechanical strength of the separator, a coated separator including a ceramic component or a polymer material may be used. For example, the separator may have a mono-layered or multi-layered structure.

Hereinafter, certain embodiments are described with reference to examples. However, these examples are exemplary, and the present disclosure is not limited thereto.

Furthermore, what is not described in this disclosure may be sufficiently understood by those who have knowledge in this field and will not be illustrated here.

Example 1

$LiCoO_2$, a binder and carbon black (super-P) were added to an N-methylpyrrolidone (NMP) solvent, thereby preparing a slurry including $LiCoO_2$, a binder and carbon black at a weight ratio of 96:2:2. Here, the binder was prepared by mixing polyvinylidene fluoride (having a weight average molecular weight of 600,000 to 700,000 g/mol) having Tm of 172° C. and Tc of 132° C., carboxyl group-containing polyvinylidene fluoride (having a weight average molecular weight 1,000,000 to 1,100,000 g/mol) having Tm of 165° C. and Tc of 125° C. and poly(vinylidenefluoride-tetrafluoroethylene) (having a weight average molecular weight of 600,000 g/mol) to a weight ratio of 70:15:15.

The poly(vinylidenefluoride-tetrafluoroethylene) may include about 25 mol % of a repeating unit derived from tetrafluoroethylene (e.g., the tetrafluoroethylene monomer), based on the total moles of repeating units of the poly (vinylidenefluoride-tetrafluoroethylene). The slurry was coated on an aluminum (Al) thin film and then, dried and compressed, thereby manufacturing a positive electrode.

On the other hand, natural graphite, a styrene-butadiene rubber and carboxymethyl cellulose were mixed to a weight ratio of 97.5:1.5:1 and then, dispersed into water, thereby preparing a slurry. The slurry was coated on a copper foil and then, dried and compressed, thereby manufacturing a negative electrode.

An electrolyte solution was prepared by mixing ethylene carbonate, ethylmethyl carbonate and dimethyl carbonate to a volume ratio of 3:5:2 and adding $LiPF_6$ to the mixed solvent to a concentration of 1.15 M.

The positive electrode, the negative electrode and the electrolyte solution were used with a polyethylene separator, thereby manufacturing a rechargeable lithium battery cell.

Example 2

A rechargeable lithium battery cell was manufactured according to substantially the same method as described with respect to Example 1 except for using polyvinylidene fluoride, a carboxyl group-containing polyvinylidene fluoride and poly(vinylidenefluoride-tetrafluoroethylene) at a weight ratio of 60:20:20 to manufacture the positive electrode.

Example 3

A rechargeable lithium battery cell was manufactured according to substantially the same method as described with respect to Example 1 except for using polyvinylidene fluoride, a carboxyl group-containing polyvinylidene fluoride and poly(vinylidenefluoride-tetrafluoroethylene) at a weight ratio of 76:8:16 to manufacture the positive electrode.

Comparative Example 1

A rechargeable lithium battery cell was manufactured according to substantially the same method as described with respect to Example 1 except for using polyvinylidene fluoride having Tm of 172° C. and Tc of 132° C. as a single binder to manufacture the positive electrode.

Comparative Example 2

A rechargeable lithium battery cell was manufactured according to substantially the same method as described with respect to Example 1 except for using polyvinylidene fluoride having Tm of 172° C. and Tc of 132° C. and carboxyl group-containing polyvinylidene fluoride having Tm of 165° C. and Tc of 125° C. at a weight ratio of 95:5 to manufacture the positive electrode.

Comparative Example 3

A rechargeable lithium battery cell was manufactured according to substantially the same method as described with respect to Example 1 except for using polyvinylidene fluoride having Tm of 172° C. and Tc of 132° C. and poly(vinylidenefluoride-tetrafluoroethylene) at a weight ratio of 95:5 to manufacture the positive electrode.

Comparative Example 4

A rechargeable lithium battery cell was manufactured according to substantially the same method as described with respect to Example 1 except for using carboxyl group-containing polyvinylidene fluoride having Tm of 165° C. and Tc of 125° C. and poly(vinylidenefluoride-tetrafluoroethylene) at a weight ratio of 75:25 to manufacture the positive electrode.

Evaluation 1: Binding Force of Electrode

Binding force of each positive electrode according to Examples 1 to 3 and Comparative Examples 1 to 4 was evaluated. The results are shown in the following Table 1.

An electrode plate was prepared to have a size of 100 mm×25.4 mm and then, was attached to a glass plate having a size of 50 mm×25.4 mm. Here, a double-sided adhesive tape was used to well attach (securely attach) the electrode to the glass plate. This specimen was fixed in a tensile tester in an up-down vertical direction. After fixing the glass plate with a lower grip and the electrode with an upper grip, a measurement value obtained by pulling the glass plate and the electrode in 180° directions (e.g., respective directions facing away from each other) until they were completely detached from one another was recorded.

Evaluation 2: Flexibility of Electrode

Flexibility of each positive electrode according to Examples 1 to 3 and Comparative Examples 1 to 4 was evaluated. The results are shown in the following Table 1.

An electrode was cut into a size of 100 mm×25.4 mm and then, fixed in a flexibility-measuring device in a vertical direction and bent in a length direction by applying a predetermined (set) force thereon, and here, a resistance force against the applied force was measured.

TABLE 1

| | Binding force (gf/mm) | Flexibility (gf/mm$^2$) |
|---|---|---|
| Example 1 | 3.503 | 1.81 |
| Example 2 | 3.142 | 3.02 |
| Example 3 | 2.996 | 2.18 |
| Comparative Example 1 | 1.923 | 3.19 |
| Comparative Example 2 | 4.86 | 4.31 |
| Comparative Example 3 | 1.56 | 2.56 |
| Comparative Example 4 | 3.652 | 3.56 |

Referring to Table 1, the positive electrodes of Examples 1 to 3 using a mixture of three kinds of binder according to one embodiment showed increased binding force and flexibility as compared with the positive electrode of Comparative Example 1 (which included one kind of the binder) and the positive electrodes of Comparative Examples 2 to 4 (which included a mixture of two kinds of the binder). For example, Comparative Examples 2 and 4 showed an excellent binding force but decreased or insufficient flexibility and thus, were not suitable or appropriate to be used to manufacture a battery.

Evaluation 3: Cycle-Life Characteristics of Rechargeable Lithium Battery Cell

Cycle-life characteristics of the rechargeable lithium battery cells according to Examples 1 and 3 and Comparative Examples 1 and 3 were evaluated by charging them in a constant current-constant voltage state under a condition of 0.7 C and 4.35 V to an ending current of 90 Ma and discharging them down to 3.0 V under a constant current condition of 0.5 C. The results are shown in FIG. 2.

Figure 2:
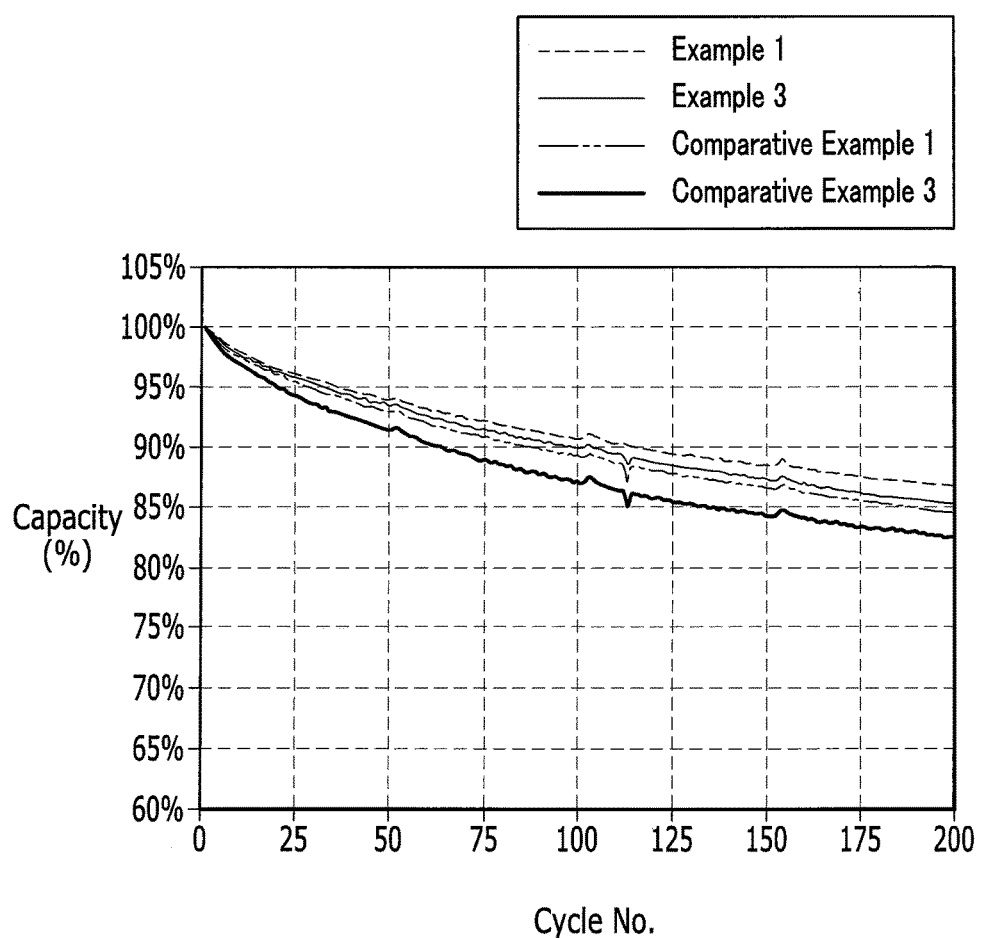
FIG. 2 is a graph showing cycle-life characteristics of rechargeable lithium battery cells according to Examples 1 and 3 and Comparative Examples 1 and 3.

FIG. 2 is a graph showing cycle-life characteristics of the rechargeable lithium battery cells according to Examples 1 and 3 and Comparative Examples 1 and 3.

Referring to FIG. 2, the positive electrodes of Examples 1 and 3 using a mixture of three kinds of binder according to one embodiment showed excellent cycle-life characteristics as compared with the positive electrode of Comparative Example 1 (which included one kind of the binder) and the positive electrode of Comparative Example 3 (which included a mixture of two kinds of the binder).

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:
1. A positive electrode for a rechargeable lithium battery, comprising:
    a positive active material, and
    a binder comprising:
        polyvinylidene fluoride,
        a carboxyl group-containing polyvinylidene fluoride,
        and poly(vinylidenefluoride-tetrafluoroethylene), wherein the carboxyl group-containing polyvinylidene fluoride has a different crystallization temperature (Tc) from a crystallization temperature (Tc) of the polyvinylidene fluoride, and the crystallization temperature (Tc) of the carboxyl group-containing polyvinylidene fluoride is about 125° C. to about 145° C.

2. The positive electrode for a rechargeable lithium battery of claim 1, wherein the polyvinylidene fluoride has a different melting point (Tm) from a melting point (Tm) of the carboxyl group-containing polyvinylidene fluoride, and
the melting point (Tm) of the polyvinylidene fluoride is about 148° C. to about 176° C.

3. The positive electrode for a rechargeable lithium battery of claim 1, wherein the polyvinylidene fluoride has a different crystallization temperature (Tc) from a crystallization temperature (Tc) of the carboxyl group-containing polyvinylidene fluoride, and
the crystallization temperature (Tc) of the polyvinylidene fluoride is about 132° C. to about 147° C.

4. The positive electrode for a rechargeable lithium battery of claim 1, wherein the polyvinylidene fluoride is included in the binder in an amount of about 60 wt % to about 80 wt % based on the total weight of the binder.

5. The positive electrode for a rechargeable lithium battery of claim 1, wherein the carboxyl group-containing polyvinylidene fluoride comprises at least one carboxyl group in a repeating unit derived from vinylidenefluoride.

6. The positive electrode for a rechargeable lithium battery of claim 1, wherein the carboxyl group-containing polyvinylidene fluoride is included in the binder in an amount of about 5 wt % to about 20 wt % based on the total weight of the binder.

7. The positive electrode for a rechargeable lithium battery of claim 1, wherein the poly(vinylidenefluoride-tetrafluoroethylene) is included in the binder in an amount of about 5 wt % to about 20 wt % based on the total weight of the binder.

8. The positive electrode for a rechargeable lithium battery of claim 1, wherein the carboxyl group-containing polyvinylidene fluoride and the poly(vinylidenefluoride-tetrafluoroethylene) are included in the binder at a weight ratio of about 0.25:1 to about 1:1.

9. A rechargeable lithium battery comprising the positive electrode of claim 1.

10. A positive electrode for a rechargeable lithium battery, comprising:
a positive active material, and
a binder comprising:
polyvinylidene fluoride,
a carboxyl group-containing polyvinylidene fluoride, and poly(vinylidenefluoride-tetrafluoroethylene),
wherein the carboxyl group-containing polyvinylidene fluoride has a different melting point (Tm) from a melting point (Tm) of the polyvinylidene fluoride, and
the melting point (Tm) of the carboxyl group-containing polyvinylidene fluoride is about 145° C. to about 174° C.

11. The positive electrode for a rechargeable lithium battery of claim 10, wherein the polyvinylidene fluoride is included in the binder in an amount of about 60 wt % to about 80 wt % based on the total weight of the binder.

12. The positive electrode for a rechargeable lithium battery of claim 10, wherein the carboxyl group-containing polyvinylidene fluoride comprises at least one carboxyl group in a repeating unit derived from vinylidenefluoride.

13. The positive electrode for a rechargeable lithium battery of claim 10, wherein the carboxyl group-containing polyvinylidene fluoride has a different crystallization temperature (Tc) from a crystallization temperature (Tc) of the polyvinylidene fluoride, and
the crystallization temperature (Tc) of the carboxyl group-containing polyvinylidene fluoride is about 125° C. to about 145° C.

14. The positive electrode for a rechargeable lithium battery of claim 10, wherein the poly(vinylidenefluoride-tetrafluoroethylene) comprises about 10 mol % to about 40 mol % of a repeating unit derived from tetrafluoroethylene based on the total moles of repeating units of the poly(vinylidenefluoride-tetrafluoroethylene).

15. A positive electrode for a rechargeable lithium battery, comprising:
a positive active material, and
a binder comprising:
polyvinylidene fluoride,
a carboxyl group-containing polyvinylidene fluoride, and poly(vinylidenefluoride-tetrafluoroethylene),
wherein the poly(vinylidenefluoride-tetrafluoroethylene) comprises about 10 mol % to about 40 mol % of a repeating unit derived from tetrafluoroethylene based on the total moles of repeating units of the poly(vinylidenefluoride-tetrafluoroethylene).

16. The positive electrode for a rechargeable lithium battery of claim 15, wherein the polyvinylidene fluoride is included in the binder in an amount of about 60 wt % to about 80 wt % based on the total weight of the binder.

17. The positive electrode for a rechargeable lithium battery of claim 15, wherein the carboxyl group-containing polyvinylidene fluoride comprises at least one carboxyl group in a repeating unit derived from vinylidenefluoride.

18. The positive electrode for a rechargeable lithium battery of claim 15, wherein the carboxyl group-containing polyvinylidene fluoride has a different melting point (Tm) from a melting point (Tm) of the polyvinylidene fluoride, and
the melting point (Tm) of the carboxyl group-containing polyvinylidene fluoride is about 145° C. to about 174° C.

19. The positive electrode for a rechargeable lithium battery of claim 15, wherein the carboxyl group-containing polyvinylidene fluoride has a different crystallization temperature (Tc) from a crystallization temperature (Tc) of the polyvinylidene fluoride, and
the crystallization temperature (Tc) of the carboxyl group-containing polyvinylidene fluoride is about 125° C. to about 145° C.

* * * * *